Sept. 11, 1956      H. C. BIERMAN      2,762,687
METHOD OF MAKING ALKALI EARTH METAL CYANIDE
Filed May 3, 1952
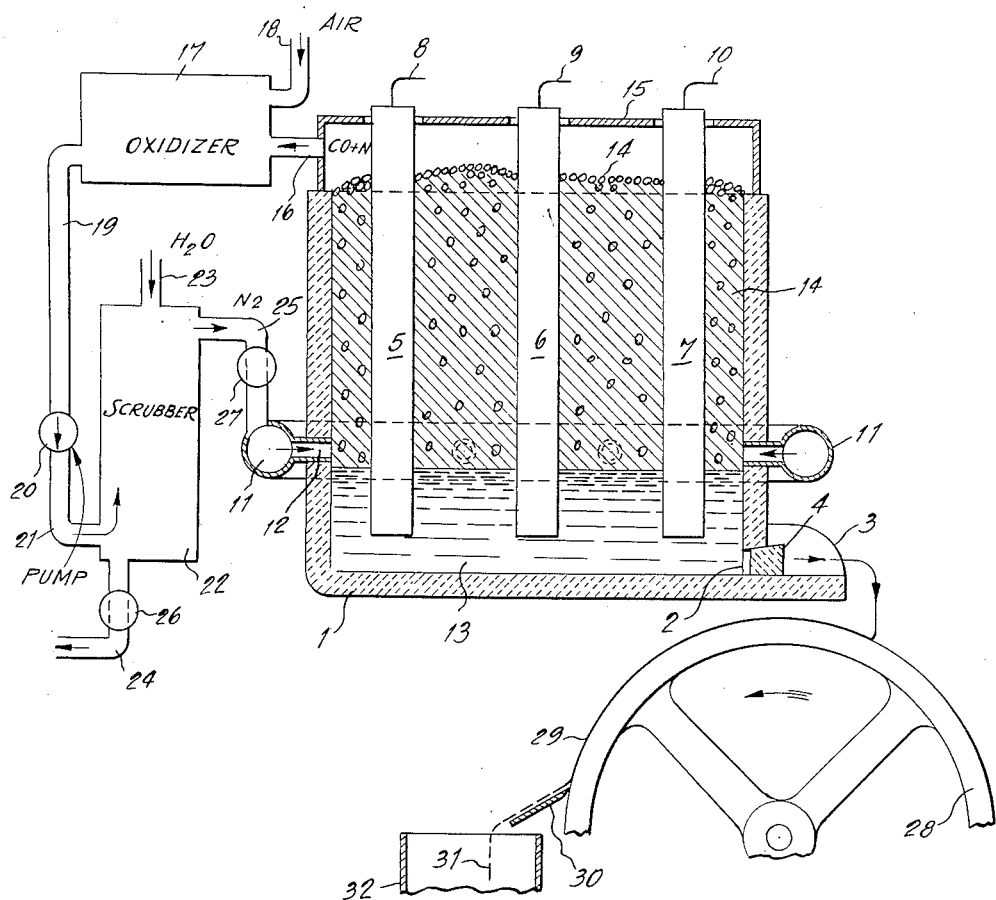
INVENTOR.
Harry C. Bierman United States Patent Office 2,762,687
Patented Sept. 11, 1956

2,762,687

METHOD OF MAKING ALKALI EARTH METAL CYANIDE

Harry C. Bierman, New Rochelle, N. Y.

Application May 3, 1952, Serial No. 285,930

8 Claims. (Cl. 23—79)

This invention relates to the manufacture of cyanides, more particularly to the alkali earth metal cyanides and to a process wherein the reactions take place at high temperatures. The present application is a continuation-in-part of my co-pending application Serial No. 793,007, filed December 20, 1947, for Method of Producing Cyanides, now abandoned.

A process was known in which barium carbonate was mixed with carbon, was introduced into a furnace in the presence of air or nitrogen and heated to a high temperature. A reaction took place wherein the barium carbonate or the like was transformed into cyanide. The reaction was incomplete and the mass was sintered, rendering it difficult to remove the cyanide from the unreacted materials and by-products. Because of such difficulties, the contents of the furnace were subjected to leaching with water to remove the cyanide in the form of a solution which was then treated in order to obtain sodium cyanide. However, this introduced a considerable expense both in operation and in apparatus and it greatly lowered the yield of cyanide.

A considerable proportion of the nitrogen was fixed in the form of barium cyanamid which represented a loss in the operation. The process was wasteful of energy, and there was local overheating which further tended to uneconomical operation and to the formation of a non-uniform product. Nitrogen was introduced at the top of the furnace, and by reason of the heating from below, the nitrogen did not remain in contact with the charge during the reaction period. This further tended to reduce the efficiency of the operation. All those difficulties were so great that they eventually resulted in the abandonment of the operation.

There was another prior art process in which a mixture of calcium cyanamid, carbon and sodium chloride was caused to react under the influence of a single phase electric arc for the production of a molten mixture of the cyanides and chlorides of calcium and sodium. This process involved local heating of a relatively small amount of the reaction mixture by means of the arc so as to, in an extremely short time, cause a reaction to take place to form molten cyanide, which was immediately removed from the furnace. This process had a number of disadvantages in that because of the presence of an arc, with its accompanying high temperature, there was substantial decomposition of the nitrogen compounds. Due to the restricted zone of heating, and the relatively small amount of molten material in the furnace at any time, there were great variations in the temperature and in the time of reaction, so that the final product was irregular in quantity and in its cyanide content. Because of the wide fluctuations in the current from almost a short circuit to a free arc, it affected the operation of the electrical apparatus, and was quite detrimental to the equipment. Because of the high temperatures at points close to the refractories, these deteriorated very rapidly and required frequent replacement.

The present invention is intended and adapted to overcome the difficulties and disadvantages of prior art processes, it being among the objects thereof to simplify them and to render the same so effective as to be commercially workable.

It is also among the objects of the present invention to provide a method of making alkali earth metal cyanides in which no water-soluble salts are necessarily present and wherein the product formed in the procedure is uniform and contains a high percentage of cyanide.

It is further among the objects of the invention to provide a process which operates rapidly and produces a high degree of conversion of raw material to cyanide on a large scale.

In the present invention, an alkaline earth cyanamid mixed with carbon, or an alkaline earth carbide in contact with nitrogen, or an alkaline earth oxide in contact with carbon and nitrogen, is heated intensively to above the fusion point of the starting material whereby cyanide is formed. A large or deep pool of molten cyanide is maintained and the heat for the reaction is derived from submerged electrodes in the pool whereby the resistance of the molten material to the flow of current maintains the temperature at the point necessary for cyanide formation. The heat is most effectively obtained by three-phase electrodes, the ends of which are immersed in the fused mass, and by causing the above materials for reaction to pass downwardly between the electrodes whereby they become preheated before passing into the reaction zone at or in the pool.

In one aspect of my invention, a mixture of barium cyanide and barium cyanamid with carbon is heated intensively, internally and quickly, and there is a conversion of the entire mass into molten barium cyanide. The barium cyanide in the reaction mixture acts as a flux to facilitate the reaction of the cyanamid with the carbon. The heating, while it is intensive, must be controlled so that the temperature of the reaction does not rise so high as to cause decomposition of the nitrogen compounds and the control must also be such as to maintain a sufficiently high temperature in the furnace to allow the reaction to go on at a rapid rate, say at about 1000° to 1450° C.

In order to obtain the desired control, I provide within the furnace a pool or bath of molten barium cyanide of relatively large volume which is maintained in the furnace at the desired high temperature by electric current flowing through the same. This pool allows the barium cyanide and barium cyanamid which pass downward in the furnace to dissolve therein and the reaction takes place very readily in solution. Reversion of the cyanide to cyanamid cannot take place because of the relatively high and uniform temperature of the pool which stabilizes the solution.

The reactions which take place in the process may consist in first, the calcination of barium carbonate or the reaction thereof with carbon, whereby barium oxide is formed. Second, the barium oxide mixed with carbon is heated, a reaction taking place therebetween to form liquid particles of barium carbide and CO gas, which passes out of the furnace. Third, nitrogen is introduced into the furnace at a number of points just above the pool of liquid material and such nitrogen coming in contact with the barium carbide reacts therewith to form barium cyanide. As the temperature in this zone may not be sufficiently high, a reverse reaction may take place whereby the cyanide may in part decompose into barium cyanamid and finely divided carbon. Fourth, as the mixture thus formed drops into the pool, any such reversion products are again converted into cyanide, which is stable at the high temperature.

The pool of molten material may be tapped from time to time, or may be tapped more or less continuously, and the molten product cooled preferably by quick chilling to give the final product without reversion. Care is taken that the pool is always maintained at a relatively large volume so as to have sufficient heat capacity to maintain a uniform temperature. By this process a barium cyanide containing the equivalent of about 40–50% sodium cyanide is obtainable. The product does not contain any soluble salts other than the barium cyanide and, therefore, it may be used successfully in various operations, particularly for conversion into other cyanides. It is anhydrous and so does not require any evaporation for the removal of water.

The nitrogen for this operation may be obtained from any of the well known sources, as, for example, it may be produced by the liquefaction of air. However, in this case, it may be economical to oxidize a part of the CO arising from the operation with air at a low temperature in the presence of suitable catalysts, whereby the CO is converted to $CO_2$, and the $CO_2$ is removed by scrubbing with water under pressure, leaving substantially pure nitrogen with perhaps a small amount of CO or $CO_2$ therein. This nitrogen may then be used for the nitrifying operation.

In the manufacture of calcium cyanide which is more difficult than barium cyanide, the starting material is calcium cyanamid which contains sufficient carbon to form cyanide. The finely ground starting material is usually mixed with, say, 20–30% of sodium chloride or the like and fed into the furnace which has a large or deep pool of liquid calcium cyanide and sodium chloride in the bottom thereof. The multiphase electrodes submerged in the pool serve to maintain the liquid condition by resistance heating, and the material passes down between the electrodes, being preheated before entering the pool, where the reaction forming cyanide takes place. Because of the relatively large volume in the pool, the temperature can be controlled closely at the optimum for the reaction and fluctuations in temperature are avoided. As a result, the temperature does not rise to a point where decomposition of cyanamid or cyanide occurs, as occurred in the prior process. Also a more uniform cyanide content in the product is obtained because of the continual blending of freshly made cyanide.

The calcium cyanide may be tapped from the pool either intermittently or continuously. It is necessary that it be chilled rapidly from the molten state to a low temperature, say about 200°–400° C., as the rate of reversion at higher temperatures, say 700°–1000° C., is rapid. This chilling may be by cooling in thin films or layers on a cold metal surface with internal water circulation. The calcium cyanide contains 55% or even more of sodium cyanide equivalent.

A mixed calcium-barium cyanide may also be formed within the invention. One method of accomplishing the result is to mix calcium oxide with barium oxide or the like and carbon and treat the mixture as usual to form liquid carbides which are tapped from the carbide furnace and allowed to solidify. The ratio by weight of calcium to barium is about 3 or 4 to 1. The carbides are ground and treated with nitrogen as is usual in the formation of calcium cyanamid from calcium carbide; this produces a mixture of carbon, calcium cyanamid, barium cyanamid, and barium cyanide. The latter is a flux so that in the next stage it is unnecessary to add sodium chloride or other flux. The product is ground and fed into the liquid pool of calcium and barium cyanides, as described above, and the pool tapped at will. A higher cyanide content is obtained than when a chloride flux is used, and the cyanide content may be about 60–70% calculated as sodium cyanide.

The invention is more fully disclosed in connection with the accompanying drawing constituting a part hereof and in which like reference characters indicate like parts, in which The single figure is a diagrammatic view of a furnace and associated elements illustrating the operation of the present invention, wherein nitrification takes place within the furnace.

Furnace 1 is provided with a tap-hole 2 and a spout 3. A plug 4 is used to control the flow of liquid from the furnace. A series of carbon electrodes 5, 6 and 7 have cables 8, 9 and 10, respectively, connected to a suitable source of three-phase current. A bustle pipe 11 has a series of inlet pipes 12 extending into the furnace above the level of the liquid 13 therein. The granular charge 14 of, say, coke and barium oxide, practically fills the furnace.

A cover 15 having charging openings (not shown) encloses the top of the furnace and the outlet 16 thereof leads into oxidizing chamber 17 into which extends pipe 18 for air for combustion. The mixture of nitrogen and $CO_2$ produced therein flows out through pipe 19 and is put under pressure by pump 20 and the compressed gases flow through pipe 21 into pressure scrubber 22. Water 23 enters the top and leaves through pipe 24. The nitrogen flows out through pipe 25 and into pipe 11. Valves 26 and 27 control the flow of water and nitrogen from the system.

In operation, current is caused to flow between the electrodes and the floor of the furnace, the charge is introduced and nitrogen caused to flow through pipe 11. A reaction occurs forming cyanide in the molten state and as it accumulates, it forms a pool, the temperature of which is maintained by resistance heating, and the molten cyanide may be tapped off at 2. The mixture of CO and nitrogen formed in the process passes into chamber 17 where the CO is oxidized to $CO_2$ and the $CO_2$ is scrubbed out in scrubber 22. The relatively pure nitrogen thus obtained then enters the furnace.

A rotating wheel 28 is placed below spout 3 so that the molten cyanide falls on the face thereof. The wheel is kept cool by internal water cooling so that the cyanide is chilled in a thin film 29. A scraper 30 lifts the film and breaks it up into flakes 31, which fall into container 32.

The present process differs from the prior art process in that there is a pool of molten material of substantial size at all times in the furnace, and the temperature is uniform, high and easily maintained for maximum efficiency. The prior art process used a single electrode, whereas in the present operation, in order to obtain the desired stability and high temperature of the furnace, a plurality of electrodes, preferably three-phase current, is used. Direct current may be used, if desired, or the circumstances warrant such use.

The reaction may be conducted in two or more stages corresponding to the series of reactions set forth above, and the claims are intended to include such variations. These and other changes may be made in the details of my invention, the scope of which is defined by the claims appended hereto.

I claim:

1. A method of making alkali earth metal cyanides which comprises providing a mixture of alkali earth metal cyanamid and carbon, providing a relatively deep pool of liquid alkali earth metal cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

2. A method of making alkali earth metal cyanides which comprises providing a mixture of alkali earth metal cyanamid and carbon, together with a salt taken from the class consisting of alkali and alkali earth metal halides, providing a relatively deep pool of liquid alkali earth metal cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

3. A method of making alkali earth metal cyanides which comprises providing a mixture of alkali earth metal cyanamid and carbon, together with alkali earth metal chlorides, providing a relatively deep pool of liquid alkali earth metal cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

4. A method of making alkali earth metal cyanides which comprises providing a mixture of barium oxide, nitrogen and carbon, providing a relatively deep pool of liquid barium cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

5. A method of making alkali earth metal cyanides which comprises providing a mixture of calcium cyanamid and carbon, providing a relatively deep pool of liquid calcium cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

6. A method of making alkali earth metal cyanides which comprises providing a mixture of barium carbide and nitrogen, providing a relatively deep pool of liquid barium cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said pool, maintaining a substantially constant temperature of about 1000° to 1450° C., feeding said mixture to said pool to form molten alkali earth metal cyanide, and tapping part of said pool.

7. A method of making alkali earth metal cyanide which comprises providing a mixture of alkali earth metal cyanamid and carbon, providing a relatively deep pool of liquid alkali earth metal cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistaance heating and flow of current between said electrodes in said pool, maintaining a substantially constant temperature of at least 1000° C. to cause a rapid reaction to take place in said pool but not over 1450° C. to avoid substantial decomposition of the cyanamid and cyanide present, feeding said mixture to said pool to form molten alkali earth metal cyanide, and tapping part of said pool.

8. A method of making alkali earth metal cyanides which comprises providing a mixture of alkali earth metal cyanamid and carbon, together with alkali metal chlorides, providing a relatively deep pool of liquid alkali earth metal cyanide, heating said pool by passing electric current through a plurality of laterally spaced electrodes in which a substantial portion of the length of said electrodes is submerged in said pool to cause electric current to flow through a substantial part of said pool to heat said cyanide and to provide resistance heating and flow of current between said electrodes in said space, maintaining a substantially constant temperature of about 1000° to 1450° C., feeding said mixture to said pool to form molten alkali earth metal cyanide, and tapping part of said pool.

References Cited in the file of this patent

UNITED STATES PATENTS

| | | |
|---|---|---|
| 1,037,061 | Sweitzer et al. | Aug. 27, 1912 |
| 1,073,373 | Acker | Sept. 2, 1913 |
| 1,123,763 | Lamb | Jan. 5, 1915 |
| 1,186,921 | Lindblad | June 13, 1916 |
| 1,187,633 | Lindblad | June 20, 1916 |
| 1,282,405 | Freeman | Oct. 22, 1918 |
| 1,501,840 | Deguide | July 15, 1924 |
| 2,235,644 | Richardson | Mar. 18, 1941 |

FOREIGN PATENTS

| | | |
|---|---|---|
| 878,035 | France | Sept. 21, 1942 |

OTHER REFERENCES

Riegel: "Industrial Chemistry" (4th ed.), page 300.